(12) United States Patent
Jokinen et al.

(10) Patent No.: US 8,879,732 B2
(45) Date of Patent: Nov. 4, 2014

(54) DYNAMIC CONTENT-BASED CIPHERING ON A CONTROL CHANNEL

(75) Inventors: Harri A. Jokinen, Pertteli (FI); Guillaume Sebire, Espoo (FI)

(73) Assignee: Nokia Corporation, Espoo (FI)

(*) Notice: Subject to any disclaimer, the term of this patent is extended or adjusted under 35 U.S.C. 154(b) by 374 days.

(21) Appl. No.: 12/925,070

(22) Filed: Oct. 13, 2010

(65) Prior Publication Data

US 2012/0093314 A1    Apr. 19, 2012

(51) Int. Cl.
H04L 29/06 (2006.01)
H04W 4/02 (2009.01)
H04W 4/14 (2009.01)

(52) U.S. Cl.
CPC ............. H04W 4/02 (2013.01); H04L 63/0457 (2013.01); H04W 4/14 (2013.01)
USPC ........... 380/250; 380/247; 380/255; 713/150; 713/165; 726/1

(58) Field of Classification Search
None
See application file for complete search history.

(56) References Cited

U.S. PATENT DOCUMENTS

| | | | | |
|---|---|---|---|---|
| 6,516,065 | B1* | 2/2003 | Joshi et al. | 380/270 |
| 6,636,502 | B1* | 10/2003 | Lager et al. | 370/352 |
| 6,751,205 | B2* | 6/2004 | Menon et al. | 370/328 |
| 7,042,855 | B1* | 5/2006 | Gilchrist et al. | 370/328 |
| 7,174,158 | B2* | 2/2007 | Cini et al. | 455/411 |
| 7,197,145 | B2* | 3/2007 | Yi | 380/270 |
| 7,308,477 | B1* | 12/2007 | Gress et al. | 709/206 |
| 7,313,371 | B2* | 12/2007 | Gibbs | 455/127.1 |
| 7,324,556 | B2* | 1/2008 | Hoff et al. | 370/469 |
| 7,526,287 | B2* | 4/2009 | Hwang et al. | 455/422.1 |

(Continued)

FOREIGN PATENT DOCUMENTS

| | | |
|---|---|---|
| EP | 1248487 A2 | 8/2010 |
| WO | WO 2009043622 A1 | 4/2009 |

(Continued)

OTHER PUBLICATIONS

Decker, P. A Packet Radio Protocol for Group Communication Suitable for the GSM Mobile Radio Network. 5th IEEE International Symposium on Personal, Indoor and Mobile Radio Communications. vol. 3. Pub. Date: 1993. Relevant pp. 934-938. http://ieeexplore.ieee.org/stamp/stamp.jsp?tp=&arnumber=529097.*

(Continued)

*Primary Examiner* — Kambiz Zand
*Assistant Examiner* — Jeremiah Avery
(74) *Attorney, Agent, or Firm* — Harrington & Smith

(57) ABSTRACT

In an exemplary embodiment content of a data message to be sent on a control channel is determined, and a selection is made between ciphering and not ciphering the data message based on the determined content. By example if from the content it is determined that that the data message is a SMS message, ciphering is selected and the control channel is a SACCH; else ciphering is not selected. Such a determination may be made by checking a service access point identifier for a data block comprising the data message. A data message within a data block received on the control channel is determined to be ciphered or not ciphered using only information within the data block, and the received data message is processed according to the determination. In another embodiment the FACCH is selected for sending the message if it is a SMS, and ciphering is selected for all data blocks sent on the FACCH.

18 Claims, 15 Drawing Sheets

(56) References Cited

U.S. PATENT DOCUMENTS

| | | | |
|---|---|---|---|
| 7,640,575 B2* | 12/2009 | Brown et al. | 726/1 |
| 7,961,875 B2* | 6/2011 | Sachs et al. | 380/29 |
| 7,969,624 B2* | 6/2011 | Mestha et al. | 358/504 |
| 7,969,924 B2* | 6/2011 | Young et al. | 370/311 |
| 8,532,614 B2* | 9/2013 | Somasundaram et al. | 455/410 |
| 2007/0140491 A1* | 6/2007 | Yi | 380/250 |
| 2008/0192925 A1 | 8/2008 | Sachs et al. | 380/29 |
| 2008/0292101 A1 | 11/2008 | Macchi | 380/270 |
| 2009/0311988 A1* | 12/2009 | Johannesson et al. | 455/404.2 |
| 2010/0263040 A1* | 10/2010 | Norrman et al. | 726/13 |
| 2011/0126021 A1* | 5/2011 | Dhanda et al. | 713/176 |

FOREIGN PATENT DOCUMENTS

| | | |
|---|---|---|
| WO | WO 2009055414 A2 | 4/2009 |
| WO | WO 2010021764 A1 | 2/2010 |
| WO | WO 2010091966 A2 | 8/2010 |

OTHER PUBLICATIONS

International Search Report and Written Opinion for corresponding International Patent Application No. PCT/IB2011/054517 mailed Mar. 3, 2012.

Shin-Lin Shieh; Shih-Tsung Kuo; Po-Ning Chen; Yunghsiang, H.S.; "Strategies for blind transport format detection using cyclic redundancy check in UMTS WCDMA," Wireless and Mobile Computing, Networking and Communications, 2005. (WiMob'2005), IEEE International Conference on , vol. 2, No., pp. 44-50 vol. 2, Aug. 22-24, 2005.

3GPP TS 44.006 V9.1.0 (Mar. 2010); $3^{rd}$ Generation Partnership Project; Technical Specification Group GSM/EDGE Radio Access Network; Mobile Station- Base Station System (MS-BSS) interface; Data Link (DL) Layer Specification (Release 9), (60 pages).

3GPP TS 45.001 V9.3.0 (Sep. 2010); $3^{rd}$ Generation Partnership Project; Technical Specification Group GSM/EDGE Radio Access Network; Physical Layer on the Radio Path; General Description (Release 9) (44 pages).

3GPP TS 45.003 (V9.0.0 (Dec. 2009); $3^{rd}$ Generation Partnership Project; Technical Specification Group GSM/EDGE Radio Access Network Channel Coding (Release 9) (321 pages).

3GPP TS 48.058 V9.0.0 (Dec. 2009); $3^{rd}$ Generation Partnership Project; Technical Specification Group GSM/EDGE Radio Access Network; Base Station (BSC-BTS) interface; Layer 3 Specification (Release 9) (84 pages).

3GPP TS 44.018 V9.6.0 (Sep. 2010); $3^{rd}$ Generation Partnership Project; Technical Specification Group GSM/EDGE Radio Access Network; Mobile Radio Interface Layer 3 Specification; Radio Resource Control (RRC) Protocol (Release 9) (430 pages).

3 GPP TS 43.020 V9.1.0 (Dec. 2009); $3^{rd}$ Generation Partnership Project; Technical Specification Group Services and System Aspects; Security Related Network Functions (Release 9) (110 pages).

3GPP TSG GERAN2 #47, Kunming, P.R. China, Aug. 31-Sep. 2, 2010, Chairman's Summary, GP-101656 (2010) (26 pages).

"Additional A5/1-GEA1 Attack Countermeasures", Vodafone A.1.7. 2.25.2.4, GP-101243 (9 pages).

3GPP TSG-GERAN Meeting #47, Kunming, P.R. China, Aug. 30-Sep. 3, 2010, Change Request GP-101242 (2010) (5 pages).

* cited by examiner

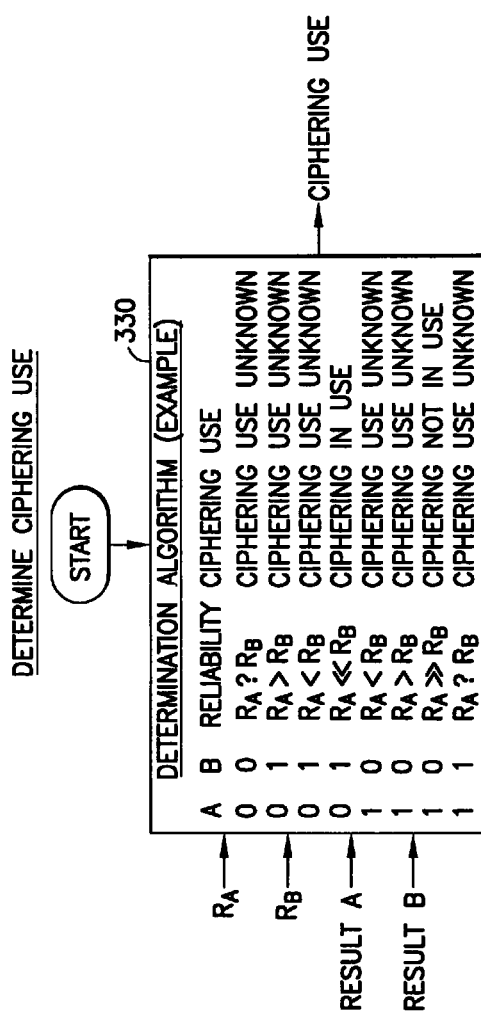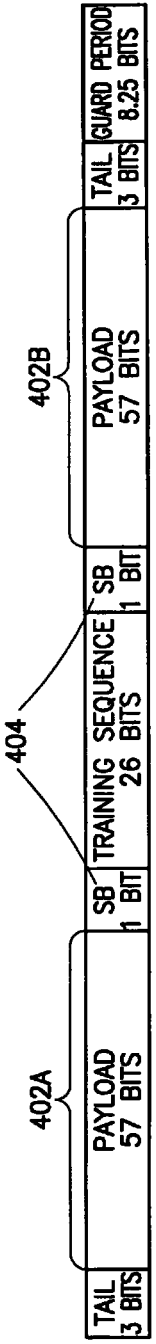

| 8 | 7 | 6 | 5 | 4 | 3 | 2 | 1 |  | REFERENCE SUB-CLAUSE |
|---|---|---|---|---|---|---|---|---|---|
| 1 | : | : | : | – | – | – | – | TYPE 1 INFO ELEMENTS |  |
| 1 | 0 | 0 | 1 | – | – | – | – | CIPHER MODE SETTING | 10.5.2.9 |
| 1 | 0 | 1 | 0 | – | – | – | – | CIPHER RESPONSE | 10.5.2.10 |
| 1 | 0 | 1 | 1 | – | – | – | – | NOTE |  |
| 1 | 1 | 0 | 1 | – | – | – | – | SYNCHRONIZATION INDICATION | 10.5.2.39 |
| 1 | 1 | 1 | 0 | – | – | – | – | CHANNEL NEEDED | 10.5.2.8 |
| 1 | 1 | 1 | 1 | – | – | – | – | SELECTIVE USE OF CIPHERING ON SACCH | 10.5.2.9a |
| 0 | : | : | : | : | : | : | : | TYPE 3 & 4 INFO ELEMENTS |  |
| 0 | 0 | 0 | 0 | 0 | 0 | 1 | 0 | FREQUENCY SHORT LIST | 10.5.2.14 |
| 0 | 0 | 0 | 0 | 0 | 1 | 0 | 1 | FREQUENCY LIST | 10.5.2.13 |
| 0 | 1 | 1 | 0 | 0 | 0 | 0 | 1 | NOTE |  |
| 0 | 1 | 1 | 0 | 0 | 0 | 1 | 0 | CELL CHANNEL DESCRIPTION | 10.5.2.1b |
| 0 | 1 | 1 | 0 | 0 | 0 | 1 | 1 | CHANNEL MODE | 10.5.2.6 |
| 0 | 1 | 1 | 0 | 0 | 1 | 0 | 0 | CHANNEL DESCRIPTION | 10.5.2.5 |
| 0 | 1 | 1 | 0 | 0 | 1 | 1 | 0 | CHANNEL MODE 2 | 10.5.2.7 |
| 0 | 1 | 1 | 0 | 1 | 0 | 0 | 0 | NOTE |  |
| 0 | 1 | 1 | 0 | 1 | 0 | 0 | 1 | FREQUENCY CHANNEL SEQUENCE | 10.5.2.12 |
| 0 | 1 | 1 | 0 | 1 | 0 | 1 | 0 | NOTE |  |
| 0 | 1 | 1 | 0 | 1 | 0 | 1 | 1 | NOTE |  |
| 0 | 1 | 1 | 0 | 1 | 1 | 0 | 0 | NOTE |  |
| 0 | 1 | 1 | 1 | 0 | 0 | 0 | 1 | NOTE |  |
| 0 | 1 | 1 | 1 | 0 | 0 | 1 | 0 | MOBILE ALLOCATION | 10.5.2.21 |
| 0 | 1 | 1 | 1 | 0 | 0 | 1 | 1 | BA RANGE | 10.5.2.1 |
| 0 | 1 | 1 | 1 | 0 | 1 | 0 | 0 | NOTE |  |
| 0 | 1 | 1 | 1 | 0 | 1 | 0 | 1 | NOTE |  |
| 0 | 1 | 1 | 1 | 0 | 1 | 1 | 0 | NOTE |  |
| 0 | 1 | 1 | 1 | 0 | 1 | 1 | 1 | MOBILE TIME DIFFERENCE | 10.5.2.21a |
| 0 | 1 | 1 | 1 | 1 | 0 | 0 | 0 | NOTE |  |
| 0 | 1 | 1 | 1 | 1 | 0 | 0 | 1 | NOTE |  |
| 0 | 1 | 1 | 1 | 1 | 0 | 1 | 0 | NOTE |  |
| 0 | 1 | 1 | 1 | 1 | 0 | 1 | 1 | TIME DIFFERENCE | 10.5.2.41 |
| 0 | 1 | 1 | 1 | 1 | 1 | 0 | 0 | STARTING TIME | 10.5.2.38 |
| 0 | 1 | 1 | 1 | 1 | 1 | 0 | 1 | TIMING ADVANCE | 10.5.2.40 |
| 0 | 1 | 1 | 1 | 1 | 1 | 1 | 0 | TMSI | 10.5.2.42 |
| 0 | 1 | 1 | 1 | 1 | 1 | 1 | 1 | NOTE |  |

NOTE: THESE VALUES WERE ALLOCATED BUT NEVER USED IN EARLIER PHASES OF THE PROTOCOL

FIG.5F

| IEI | INFORMATION ELEMENT | TYPE/REFERENCE | PRESENCE | FORMAT | LENGTH |
|---|---|---|---|---|---|
| | RR MANAGEMENT PROTOCOL DISCRIMINATOR | PROTOCOL DISCRIMINATOR 10.2 | M | V | 1/2 |
| | SKIP INDICATOR | SKIP INDICATOR 10.3.1 | M | V | 1/2 |
| | CIPHER MODE COMMAND MESSAGE TYPE | MESSAGE TYPE 10.4 | M | V | 1 |
| | CIPHERING MODE SETTING | CIPHER MODE SETTING 10.5.2.9 | M | V | 1/2 |
| | CIPHER RESPONSE | CIPHER RESPONSE 10.5.2.10 | M | V | 1/2 |
| F— | SELECTIVE USE OF CIPHERING ON SACCH | SELECTIVE USE OF CIPHERING ON SACCH 10.5.2.9a | O | TV | 1 |

FIG.6

| IEI | INFORMATION ELEMENT | TYPE/REFERENCE | PRESENCE | FORMAT | LENGTH |
|---|---|---|---|---|---|
| | RR MANAGEMENT PROTOCOL DISCRIMINATOR | PROTOCOL DISCRIMINATOR 10.2 | M | V | 1/2 |
| | SKIP INDICATOR | SKIP INDICATOR 10.3.1 | M | V | 1/2 |
| | HANDOVER COMMAND MESSAGE TYPE | MESSAGE TYPE 10.4 | M | V | 1 |
| | CELL DESCRIPTION | CELL DESCRIPTION 10.5.2.2 | M | V | 2 |
| | DESCRIPTION OF THE FIRST CHANNEL, AFTER TIME | CHANNEL DESCRIPTION 2 10.5.2.5a | M | V | 3 |
| | HANDOVER REFERENCE | HANDOVER REFERENCE 10.5.2.15 | M | V | 1 |
| | POWER COMMAND AND ACCESS TYPE | POWER COMMAND AND ACCESS TYPE 10.5.2.28a | M | V | 1 |
| D- | SYNCHRONIZATION INDICATION | SYNCHRONIZATION INDICATION 10.5.2.39 | O | TV | 1 |
| 02 | FREQUENCY SHORT LIST, AFTER TIME | FREQUENCY SHORT LIST 10.5.2.14 | C | TV | 10 |
| 05 | FREQUENCY LIST, AFTER TIME | FREQUENCY LIST 10.5.2.13 | C | TLV | 4-131 |
| 62 | CELL CHANNEL DESCRIPTION | CELL CHANNEL DESCRIPTION 10.5.2.1b | C | TV | 17 |
| 10 | DESCRIPTION OF THE MULTISLOT CONFIGURATION | MULTISLOT ALLOCATION 10.5.2.21b | C | TLV | 3-12 |
| 63 | MODE OF THE FIRST CHANNEL(CHANNEL SET 1)) | CHANNEL MODE 10.5.2.6 | O | TV | 2 |
| 11 | MODE OF CHANNEL SET 2 | CHANNEL MODE 10.5.2.6 | O | TV | 2 |
| 13 | MODE OF CHANNEL SET 3 | CHANNEL MODE 10.5.2.6 | O | TV | 2 |
| 14 | MODE OF CHANNEL SET 4 | CHANNEL MODE 10.5.2.6 | O | TV | 2 |
| 15 | MODE OF CHANNEL SET 5 | CHANNEL MODE 10.5.2.6 | O | TV | 2 |
| 16 | MODE OF CHANNEL SET 6 | CHANNEL MODE 10.5.2.6 | O | TV | 2 |
| 17 | MODE OF CHANNEL SET 7 | CHANNEL MODE 10.5.2.6 | O | TV | 2 |
| 18 | MODE OF CHANNEL SET 8 | CHANNEL MODE 10.5.2.6 | O | TV | 2 |
| 64 | DESCRIPTION OF THE SECOND CHANNEL, AFTER TIME | CHANNEL DESCRIPTION 10.5.2.5 | O | TV | 4 |
| 66 | MODE OF THE SECOND CHANNEL | CHANNEL MODE 2 10.5.2.7 | O | TV | 2 |

FIG.7A

| IEI | INFORMATION ELEMENT | TYPE/REFERENCE | PRESENCE | FORMAT | LENGTH |
|---|---|---|---|---|---|
| 69 | FREQUENCY CHANNEL SEQUENCE, AFTER TIME | FREQUENCY CHANNEL SEQUENCE 10.5.2.12 | C | TV | 10 |
| 72 | MOBILE ALLOCATION, AFTER TIME | MOBILE ALLOCATION 10.5.2.21 | C | TLV | 3-10 |
| 7C | STARTING TIME | STARTING TIME 10.5.2.38 | O | TV | 3 |
| 7B | REAL TIME DIFFERENCE | TIME DIFFERENCE 10.5.2.41 | C | TLV | 3 |
| 7D | TIMING ADVANCE | TIMING ADVANCE 10.5.2.40 | C | TV | 2 |
| 12 | FREQUENCY SHORT LIST, BEFORE TIME | FREQUENCY SHORT LIST 10.5.2.14 | C | TV | 10 |
| 19 | FREQUENCY LIST, BEFORE TIME | FREQUENCY LIST 10.5.2.13 | C | TLV | 4-131 |
| 1C | DESCRIPTION OF THE FIRST CHANNEL, BEFORE TIME | CHANNEL DESCRIPTION 2 10.5.2.5a | O | TV | 4 |
| 1D | DESCRIPTION OF THE SECOND CHANNEL, BEFORE TIME | CHANNEL DESCRIPTION 10.5.2.5 | O | TV | 4 |
| 1E | FREQUENCY CHANNEL SEQUENCE BEFORE TIME | FREQUENCY CHANNEL SEQUENCE 10.5.2.12 | C | TV | 10 |
| 21 | MOBILE ALLOCATION, BEFORE TIME | MOBILE ALLOCATION 10.5.2.21 | C | TLV | 3-10 |
| 9- | CIPHER MODE SETTING | CIPHER MODE SETTING 10.5.2.9 | O | TV | 1 |
| 01 | VGCS TARGET MODE INDICATION | VGCS TARGET MODE INDICATION 10.5.2.42a | O | TLV | 3 |
| 03 | MULTI-RATE CONFIGURATION | MULTIRATE CONFIGURATION 10.5.2.21aa | O | TLV | 4-8 |
| 76 | DYNAMIC ARFCN MAPPING | DYNAMIC ARFCN MAPPING 10.5.2.11b | O | TLV | 6-34 |
| 04 | VGCS CIPHERING PARAMETERS | VGCS CIPHERING PARAMETERS 10.5.2.42b | O | TLV | 3-15 |
| 51 | DEDICATED SERVICE INFORMATION | DEDICATED SERVICE INFORMATION 10.5.2.59 | O | TV | 2 |
| F- | SELECTIVE USE OF CIPHERING ON SACCH | SELECTIVE USE OF CIPHERING ON SACCH 10.5.2.9a | O | TV | 1 |

FIG.7B

| IEI | INFORMATION ELEMENT | TYPE/REFERENCE | PRESENCE | FORMAT | LENGTH |
|---|---|---|---|---|---|
| | RR MANAGEMENT PROTOCOL DISCRIMINATOR | PROTOCOL DISCRIMINATOR 10.2 | M | V | 1/2 |
| | SKIP INDICATOR | SKIP INDICATOR 10.3.1 | M | V | 1/2 |
| | ASSIGNMENT COMMAND MESSAGE TYPE | MESSAGE TYPE 10.4 | M | V | 1 |
| | DESCRIPTION OF THE FIRST CHANNEL, AFTER TIME | CHANNEL DESCRIPTION 2 10.5.2.5a | M | V | 3 |
| | POWER COMMAND | POWER COMMAND 10.5.2.28 | M | V | 1 |
| 05 | FREQUENCY LIST, AFTER TIME | FREQUENCY LIST 10.5.2.13 | C | TLV | 4-132 |
| 62 | CELL CHANNEL DESCRIPTION | CELL CHANNEL DESCRIPTION 10.5.2.1b | O | TV | 17 |
| 10 | DESCRIPTION OF THE MULTISLOT CONFIGURATION | MULTISLOT ALLOCATION 10.5.2.21b | C | TLV | 3-12 |
| 63 | MODE OF THE FIRST CHANNEL (CHANNEL SET 1) | CHANNEL MODE 10.5.2.6 | O | TV | 2 |
| 11 | MODE OF CHANNEL SET 2 | CHANNEL MODE 10.5.2.6 | O | TV | 2 |
| 13 | MODE OF CHANNEL SET 3 | CHANNEL MODE 10.5.2.6 | O | TV | 2 |
| 14 | MODE OF CHANNEL SET 4 | CHANNEL MODE 10.5.2.6 | O | TV | 2 |
| 15 | MODE OF CHANNEL SET 5 | CHANNEL MODE 10.5.2.6 | O | TV | 2 |
| 16 | MODE OF CHANNEL SET 6 | CHANNEL MODE 10.5.2.6 | O | TV | 2 |

FIG.8A

| FIG.8A |
|---|
| FIG.8B |

FIG.8

| | | | | |
|---|---|---|---|---|
| 17 | MODE OF CHANNEL SET 7 | CHANNEL MODE 10.5.2.6 | O | TV | 2 |
| 18 | MODE OF CHANNEL SET 8 | CHANNEL MODE 10.5.2.6 | O | TV | 2 |
| 64 | DESCRIPTION OF THE SECOND CHANNEL, AFTER TIME | CHANNEL DESCRIPTION 10.5.2.5 | O | TV | 4 |
| 66 | MODE OF THE SECOND CHANNEL | CHANNEL MODE 2 10.5.2.7 | O | TV | 2 |
| 72 | MOBILE ALLOCATION, AFTER TIME | MOBILE ALLOCATION 10.5.2.21 | C | TLV | 3–10 |
| 7C | STARTING TIME | STARTING TIME 10.5.2.38 | O | TV | 3 |
| 19 | FREQUENCY LIST, BEFORE TIME | FREQUENCY LIST 10.5.2.13 | C | TLV | 4–132 |
| 1C | DESCRIPTION OF THE FIRST CHANNEL, BEFORE TIME | CHANNEL DESCRIPTION 2 10.5.2.5a | O | TV | 4 |
| 1D | DESCRIPTION OF THE SECOND CHANNEL, BEFORE TIME | CHANNEL DESCRIPTION 10.5.2.5 | O | TV | 4 |
| 1E | FREQUENCY CHANNEL SEQUENCE BEFORE TIME | FREQUENCY CHANNEL SEQUENCE 10.5.2.12 | C | TV | 10 |
| 21 | MOBILE ALLOCATION, BEFORE TIME | MOBILE ALLOCATION 10.5.2.21 | C | TLV | 3–10 |
| 9– | CIPHER MODE SETTING | CIPHER MODE SETTING 10.5.2.9 | O | TV | 1 |
| 01 | VGCS TARGET MODE INDICATION | VGCS TARGET MODE INDICATION 10.5.2.42a | O | TLV | 3 |
| 03 | MULTI-RATE CONFIGURATION | MULTIRATE CONFIGURATION 10.5.2.21aa | O | TLV | 4–8 |
| 04 | VGCS CIPHERING PARAMETERS | VGCS CIPHERING PARAMETERS 10.5.2.42b | O | TLV | 3–15 |
| F– | SELECTIVE USE OF CIPHERING ON SACCH | SELECTIVE USE OF CIPHERING ON SACCH 10.5.2.9a | O | TV | 1 |

FIG.8B

| IEI | INFORMATION ELEMENT | TYPE/REFERENCE | PRESENCE | FORMAT | LENGTH |
|---|---|---|---|---|---|
| | RR MANAGEMENT PROTOCOL DISCRIMINATOR | PROTOCOL DISCRIMINATOR 10.2 | M | V | 1/2 |
| | SKIP INDICATOR | SKIP INDICATOR 10.3.1 | M | V | 1/2 |
| | DTM ASSIGNMENT COMMAND MESSAGE TYPE | MESSAGE TYPE 10.4 | M | V | 1 |
| | CS POWER COMMAND | POWER COMMAND 10.5.2.28 | M | V | 1 |
| | DESCRIPTION OF THE CS CHANNEL | CHANNEL DESCRIPTION 10.5.2.5 | M | V | 3 |
| | GPRS BROADCAST INFORMATION | GPRS BROADCAST INFORMATION 10.5.2.14d | M | LV | 7-n |
| 10 | CELL CHANNEL DESCRIPTION | CELL CHANNEL DESCRIPTION 10.5.2.1b | O | TV | 17 |
| 11 | CHANNEL MODE | CHANNEL MODE 10.5.2.6 | O | TV | 2 |
| 12 | FREQUENCY LIST | FREQUENCY LIST 10.5.2.13 | C | TLV | 4-132 |
| 13 | MOBILE ALLOCATION | MOBILE ALLOCATION 10.5.2.21 | C | TLV | 3-10 |
| 15 | DESCRIPTION OF THE UPLINK PACKET CHANNEL ASSIGNMENT | RR PACKET UPLINK ASSIGNMENT 10.5.2.25c | O | TLV | 3-n |
| 16 | DESCRIPTION OF THE DOWNLINK PACKET CHANNEL ASSIGNMENT | RR PACKET DOWNLINK ASSIGNMENT 10.5.2.25d | O | TLV | 3-n |
| 17 | MULTI-RATE CONFIGURATION | MULTIRATE CONFIGURATION 10.5.2.21aa | O | TLV | 4-8 |
| 9- | CIPHERING MODE SETTING | CIPHERING MODE SETTING 10.5.2.9 | O | TV | 1 |
| 18 | MOBILE ALLOCATION C2 | MOBILE ALLOCATION 10.5.2.21 | C | TLV | 3-10 |
| 19 | FREQUENCY LIST C2 | FREQUENCY LIST 10.5.2.13 | C | TLV | 4-132 |
| 20 | DESCRIPTION OF THE DOWNLINK PACKET CHANNEL ASSIGNMENT TYPE 2 | RR PACKET DOWNLINK ASSIGNMENT TYPE 2 10.5.2.25e | C | TLV | 3n |
| 21 | CHANNEL DESCRIPTION C2 | CHANNEL DESCRIPTION 3 10.5.2.5c | O | TV | 3 |
| F- | SELECTIVE USE OF CIPHERING ON SACCH | SELECTIVE USE OF CIPHERING ON SACCH 10.5.2.9a | O | TV | 1 |

FIG.9

DYNAMIC CONTENT-BASED CIPHERING ON A CONTROL CHANNEL

TECHNICAL FIELD

The exemplary and non-limiting embodiments of this invention relate generally to wireless communication systems, methods, devices and computer programs and, more specifically, relate to ciphering and deciphering of data messages sent on a control channel, and specific embodiments relate to SMS messages sent on a slow associated control channel of a GSM system.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
 3GPP third generation partnership project
 BTS base transceiver station
 BSC base station controller
 BSS base station subsystem
 CC call control
 CS circuit switched
 DL downlink (network towards UE)
 FACCH fast associated control channel
 FN frame number
 GMSK Gaussian minimum shift keying
 GSM global system for mobile communication
 IE information element
 $K_c$ ciphering key
 MM mobility management
 MSC mobile switching center
 RF radiofrequency
 RRM radio resource management
 SACCH slow associated control channel
 SAPI service access point identifier
 SI system information
 TCH traffic channel
 TDMA time division multiple access
 UE user equipment
 UL uplink (UE towards eNB)

In further refining the GSM radio access protocols, a security issue was recently identified concerning ciphering of text in System Information Type 5 (SI5) and Type 6 (SI6) messages, which are sent on the downlink SACCH. See for example documents GP-101242 (entitled "Alternating between different neighbour cell description formats, etc. by Vodafone) and GP-101243 (entitled "Additional A5/1-GEA1 Attack Countermeasures" by Vodafone) from the 3GPP TSG-GERAN Meeting #47 (Kunming, China; 30 Aug.-3 Sep. 2010). Those documents present potential solutions which are expected to be compatible with legacy mobile equipment already in use, but the inventors consider those proposed solutions as less than optimal. Document GP-101656 summarizing the 3GPP TSG-GERAN2 Meeting #47 (Kunming, China; 31 Aug.-2 Sep. 2010) shows that another solution is to not cipher at all on the SACCH. For reasons set forth below, the inventors also consider this proposal less than optimum.

These teachings set forth a solution to the above identified security gap which the inventors consider more robust and more flexible than the above referenced proposals.

SUMMARY

The foregoing and other problems are overcome, and other advantages are realized, by the use of the exemplary embodiments of this invention.

In a first aspect thereof the exemplary embodiments of this invention provide a method comprising: an apparatus determining content of a data message to be sent on a control channel; and the apparatus selecting between ciphering and not ciphering the data message based on the determined content.

In a second aspect thereof the exemplary embodiments of this invention provide a memory storing a program of computer readable instructions, that when executed by at least one processor result in actions comprising: determining content of a data message to be sent on a control channel; and selecting between ciphering and not ciphering the data message based on the determined content.

In a third aspect thereof the exemplary embodiments of this invention provide an apparatus, comprising at least one processor and at least one memory storing computer program code. The at least one memory and the computer program code are configured, with the at least one processor, to cause the apparatus at least to: determine content of a data message to be sent on a control channel; and select between ciphering and not ciphering the data message based on the determined content.

In a fourth aspect thereof the exemplary embodiments of this invention provide an apparatus, comprising determining means for determining content of a data message to be sent on a control channel; and selecting means for selecting between ciphering and not ciphering the data message based on the determined content. In a particular embodiment the determining means and the selecting means comprise at least one processor in combination with a memory storing computer program code.

In a fifth aspect thereof the exemplary embodiments of this invention provide a method comprising: an apparatus determining whether a data message within a data block received on a control channel is ciphered or not ciphered using only information within the data block; and the apparatus processing the received data message according to the determination.

In a sixth aspect thereof the exemplary embodiments of this invention provide a memory storing a program of computer readable instructions, that when executed by at least one processor result in actions comprising: determining whether a data message within a data block received on a control channel is ciphered or not ciphered using only information within the data block; and processing the received data message according to the determination.

In a seventh aspect thereof the exemplary embodiments of this invention provide an apparatus, comprising at least one processor and at least one memory storing computer program code. The at least one memory and the computer program code are configured, with the at least one processor, to cause the apparatus at least to: determine whether a data message within a data block received on a control channel is ciphered or not ciphered using only information within the data block; and process the received data message according to the determination.

In an eighth aspect thereof the exemplary embodiments of this invention provide an apparatus, comprising determining means for determining whether a data message received on a control channel is ciphered or not ciphered using only information within the data message; and processing means for processing the received data message according to the determination. In a particular embodiment the determining means comprises at least one processor and the processing means comprises at least one of a radio frequency front end and a base transceiver station.

In a ninth aspect thereof the exemplary embodiments of this invention provide a method comprising: determining that a data message to be sent on a control channel is a short message service message; and in response selecting a fast associated control channel for transmission of the data message and selecting ciphering for all data blocks sent on the fast associated control channel.

In a tenth aspect thereof the exemplary embodiments of this invention provide an apparatus, comprising at least one processor and at least one memory storing computer program code. The at least one memory and the computer program code are configured, with the at least one processor, to cause the apparatus at least to: determine that a data message to be sent on a control channel is a short message service message; and in response select a fast associated control channel for transmission of the data message and select ciphering for all data blocks sent on the fast associated control channel.

These and other aspects are detailed below with particularity.

BRIEF DESCRIPTION OF THE DRAWINGS:

FIG. 3C is a flow diagram detailing an exemplary embodiment of the determine cipher use block of FIG. 3B.

FIG. 4 is a block illustration of a normal burst of a SACCH data block with GMSK modulation, as may be selectively ciphered according to exemplary embodiments of these teachings.

FIG. 5A-F are tables illustrating relevant portions of 3GPP TS 44.018 v9.6.0 (2010-09) modified according to an exemplary embodiment to include a cipher response information element and details of that information element.

FIG. 6 is a table from 3GPP TS 44.018 v9.6.0 (2010-09) for a CIPHERING MODE COMMAND message, as modified with the information element of FIGS. 5A-F according to an exemplary embodiment.

FIGS. 7A-B form a continuous table from 3GPP TS 44.018 v9.6.0 (2010-09) for a HANDOVER COMMAND message, as modified with the information element of according to FIGS. 5A-F according to an exemplary embodiment.

FIG. 8 is a table from 3GPP TS 44.018 v9.6.0 (2010-09) for an ASSIGNMENT COMMAND message, as modified with the information element of according to FIGS. 5A-F according to an exemplary embodiment.

FIG. 9 is a table from 3GPP TS 44.018 v9.6.0 (2010-09) for a DTM ASSIGNMENT COMMAND message, as modified with the information element of according to FIGS. 5A-F according to an exemplary embodiment.

DETAILED DESCRIPTION

If ciphering on the SACCH were completely removed as proposed in document GP-101656 noted above, then this would result in SMS messages which are transmitted on the SACCH to also be not ciphered. The inventors consider the transmission of un-ciphered SMS messages to be unacceptable. According to exemplary embodiments of the invention set forth herein, the security issue noted above is fully resolved without foregoing ciphered SMS messages by selectively ciphering data to be sent on a control channel (SACCH) based on the content of the data to be sent. In this manner the security issue may be resolved by ciphering the SMS data blocks on SACCH and not ciphering the other data blocks on SACCH which are not SMS. The security issue may alternatively be resolved by not ciphering any data block on SACCH, and by not transmitting the SMS data blocks on SACCH but on FACCH (which is ciphered).

The exemplary embodiments below are in the context of the GSM system and specific to the SACCH and FACCH as will be seen, however these examples are presented for clarity of description only and the broader principles set forth herein may be implemented in other wireless radio access technologies, and/or for data messages on other control channels. The FACCH is bi-directional and associated with a traffic channel; the SACCH is also bi-directional and may be associated with a stand-alone dedicated control channel (SDCCH) or a traffic channel. Being bi-directional, SMS messages may therefore be sent on the SACCH in the DL or the UL direction. Alternatively, SMS messages could also be sent instead on FACCH in the DL or the UL direction. That the examples assume a DL SACCH is not limiting and these teachings may be applied for UL data messages also. The security issue mentioned in the background section above is identified for the DL but these teachings have utility beyond only solving that security issue and so UL messages may also use selective ciphering/not ciphering based on UL data content to ensure a consistent level of security in both DL and UL.

Figure 1:
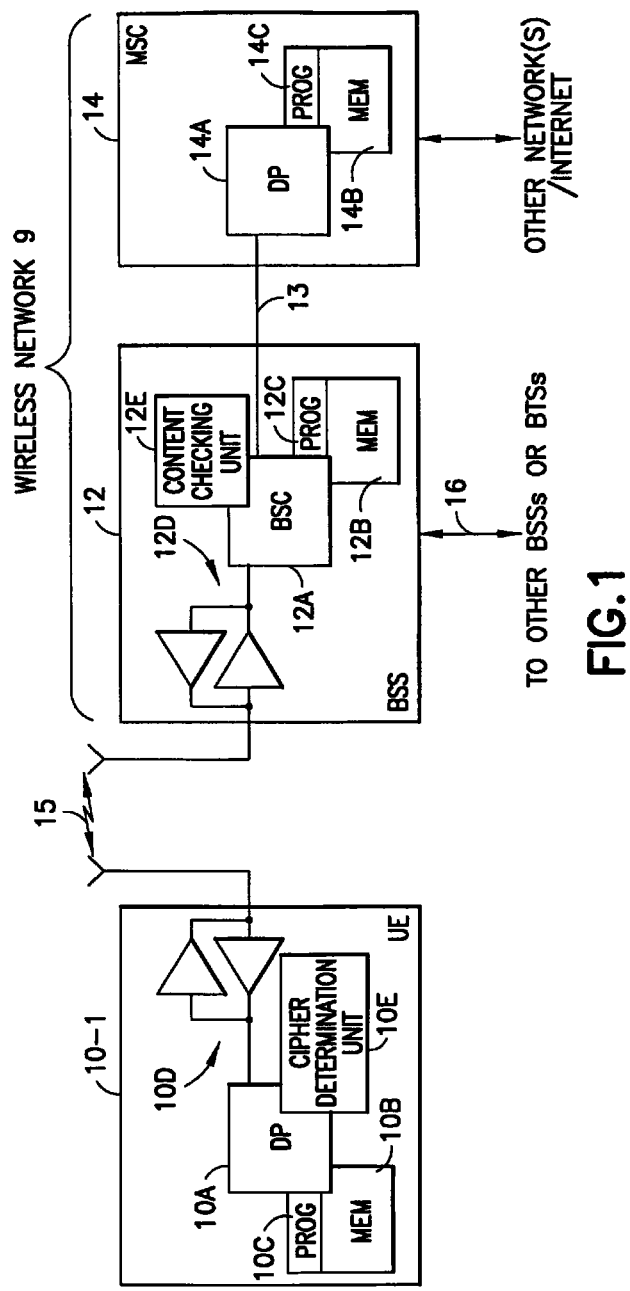
FIG. 1 shows a simplified block diagram of various electronic devices that are suitable for use in practicing the exemplary embodiments of this invention.

Before detailing exemplary embodiments of how the transmitting party can check the content of the data to be transmitted on the control channel, and how the receiving party can properly decode its received messages which may or may not be ciphered, first the relevant transmitting and receiving parties are detailed. FIG. 1 is a simplified block diagram of various electronic devices and apparatus that are suitable for use in practicing the exemplary embodiments of this invention.

In FIG. 1 a wireless network 9 is adapted for communication over a bi-directional wireless link 15 with an apparatus, such as a mobile communication device which may be referred to as a UE 10, via a network access node, such as a BSS 12. By example the bi-directional wireless link 15 may represent the SACCH, or the FACCH, or some other control channel which may or may not be bi-directional. The network 9 may include a MSC 14 which provides connectivity with a further network such as a telephone network and/or a data communications network (e.g., the internet). The MSC 14 may in other radio technologies be referred to as a mobility management entity MME and/or a gateway GW.

The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transmitter and receiver 10D for bidirectional wireless communications with the BSS 12 via one or more antennas (one shown).

The BSS 12 also includes a controller such as for example a BSC 12A which may be implemented as one or more computers or data processors (DP), a computer-readable memory medium embodied as a memory (MEM) 12B that stores a program of computer instructions (PROG) 12C, and a BTS 12D including a suitable RF transmitter and receiver for communication with the UE 10 via one or more antennas (one shown). The BSS 12 is coupled via a data/control path 13 to the MSC 14. The BSS 12 may also be coupled to another BSS via data/control path 16.

For simplicity the BSC 12A is shown as controlling only one BTS 12D at FIG. 1; in other exemplary embodiments the BSC 12A may control more than one BTS 12D, each other BTS consisting of one or more transceiver units (termed TRX in GSM). There may also be one or more additional processors apart from the BSC 12A co-located with and connected to those other BTSs but which implement commands received from the BSC 12A. In that regard the BSC 12A may be remote from a BTS 12D it controls, but such remoteness remains consistent with the BSC/BTS interface mechanism for determining message content which is detailed below. The interface between the BSC 12A and (any of) the BTS 12D may be implemented in GSM as an Abis interface. As detailed specifically at 3GPP TS 48.052 v 9.0.0 (2009-12), in GSM there is a unique mapping from traffic channels on the radio path to the terrestrial traffic channels. The BSC 12A makes the choice of radio channel (e.g., SACCH, FACCH, TCH) and thereby also of the terrestrial channel for a call or data message.

At least one of the PROGs 10C and 12C is assumed to include program instructions that, when executed by the associated DP 10A and 12A, enable the device 10, 12 to operate in accordance with the exemplary embodiments of this invention, as detailed below. That is, the exemplary embodiments of this invention may be implemented at least in part by computer software executable by the DP 10A of the UE 10 and/or by the BSC 12A of the BSS 12, or by hardware, or by a combination of software and hardware (and firmware).

For the purposes of describing the exemplary embodiments of this invention the UE 10 may be assumed to also include a cipher determination unit 10E which stores and executes the algorithm shown by non-limiting example at FIG. 3C for determining ciphering use on a given message. The BSS 12 also includes a content checking unit 12E which determines content of a data message to be sent on the control channel as is detailed further below by non-limiting example. As noted above, the messages subject to these teachings may be sent DL or UL, and so the functional blocks 10E and 12E may also be present in the respective BSS 12 and UE 10 for the case in which the data messages are sent UL. The function of those blocks 10E, 12E may be incorporated within the DP 10A and/or BSC 12A, or within the radio front end generally depicted as the transmitters/receivers 10D, 12D (BTS), or within one or more other components of the devices 10, 12. In an exemplary embodiment, interleaving, modulation and ciphering are executed in the respective radio front ends 10D, 12D.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DP 10A and the BSC 12A may be of any type suitable to the local technical environment, and may include one or more of general purpose computers, special purpose computers, microprocessors, digital signal processors (DSPs) and processors based on a multicore processor architecture, as non-limiting examples.

When ciphering is started for a GSM call (which is a CS call), all blocks exchanged between the UE 10 and the network 9 on the radio interface 15 (TCH, FACCH, SACCH) are ciphered at layer 1 after interleaving and before modulation in both downlink and uplink directions. The above overview of the exemplary embodiments noted that selecting between ciphering and not ciphering a data message to be sent on a control channel was based on the determined content of that data message. Considering that there are both transmitting and receiving entities involved, in order to selectively cipher or not cipher different data messages selectively two conditions should be satisfied.

First: the transmitting entity must be able to selectively activate or deactivate ciphering of a SACCH block (depending on whether the default condition is ciphering or not ciphering the data block). To account for the different possible default conditions, below is used the terminology "to selectively deactivate/activate/not to deactivate".

Second: the receiving entity should be able to detect whether a SACCH block is ciphered or not upon receiving that block and based on that block alone (e.g., one or more portions thereof). This alleviates adding a large volume of new signaling overhead that would result if new control signaling bits were sent on a per-block basis.

Additionally, it is practical that the transmitting entity know in advance that the receiver supports dynamic content-based ciphering on the SACCH in order that the transmitting entity may use the selective ciphering in appropriate instances; namely, when the receiving entity has the capability to dynamically detect if a data block is ciphered or not, and to decode both ciphered and un-ciphered data blocks. As is detailed below, in an embodiment the transmitting entity informs the receiving entity when it uses selective ciphering. In order also to control the signaling overhead this informing is not per data block but rather as a mode (e.g., selective ciphering/not ciphering enabled or not enabled between the transmitting and receiving entities).

In GSM, SMS on the SACCH are sent to the Data Link layer exclusively on SAPI 3. [See for example 3GPP TS 44.006 v9.1.0 (2010-03) §6.3.3; and 3GPP TS 44.018 v9.6.0 (2010-09) §1.5]. A SAPI identifies a (conceptual) point on a protocol layer which offers access to its services to some upper layer. SAPI 3 is not used for any other data. In an exemplary embodiment of the invention, the SAPI 3 is used by the transmitting entity (specifically, the BSC 12A if the transmitting entity is the BSS 12, and the DP 10A if the transmitting entity is the UE 10) for determining the content of the data block. When SAPI 3 is to be sent in a SACCH block, then it is concluded that the content of the data block to be transmitted is a SMS. Based on that determined content, then the ciphering is activated (or not de-activated) for that data block prior to transmitting it.

In the same vein, in GSM SAPI 0 is used for all other data on the SACCH (e.g., CC signaling, MM signaling and RRM signaling). The transmitting entity (specifically, the BSC 12A if the transmitting entity is the BSS 12, and the DP 10A if the transmitting entity is the UE 10) can distinguish RRM messages from CC and MM messages, and further it can also distinguish different RRM messages from one another. Consequently it can identify when a system information message (and it can also distinguish between an SI5 message and an SI6 message) is to be sent in a SACCH block. This mechanism can be used to determine the content of the non-SMS data blocks, which is then used as a trigger to de-activate (or not activate) ciphering for that data block.

When the selective ciphering/not ciphering mode is active between the UE 10 and the network 9 (BSS 12), by the above SAPI mechanisms the transmitting entity has the means to detect when ciphering of an individual SACCH block is to be activated (or de-activated or not de-activated) as a function of the content of that block. However, it is the BTS 12D (and RF front end 10D if the UE 10 is the transmitting entity) that is responsible for transmission ciphering on the radio interface for a circuit-switched connection.

Therefore in current GSM protocols it is necessary that the BTS 12D (or RF front end 10D) either detect, or be informed by the BSC 12A (or DP 10A) when ciphering of a SACCH block is to be activated (or de-activated or not de-activated). In an exemplary embodiment, the BSC 12A (or the DP 10A) derives the content of the SACCH data block using the SAPI mechanism above, and gives an indication to activate (or de-activate or not de-activate) ciphering of the subject SACCH block via the Abis interface to the BTS 12D (or RF front end 10D).

The Abis interface in GSM is not an open interface however [see 3GPP TS 48.058 v9.0.0 (2009-12)], its operation is implementation specific. The inventors present several options for the BTS 12D (or RF front end 10D) to selectively deactivate/activate/not to deactivate ciphering of SACCH blocks. In a first option implementing the ciphering or not ciphering decision follows from an indication received from the BSC 12A (or DP 10A) as noted above. In a second option the ciphering or not ciphering decision is made and implemented locally at the BTS 12D (or RF front end 10D). This second option, in an exemplary embodiment, is enabled only when the BTS 12D (or RF front end 10D is informed by the BSC 12A (or DP 10A) that dynamic content-based ciphering on SACCH is allowed for that mobile station.

For the second option in particular, note that 3GPP TS 48.058 v9.0.0 (2009-12) §8.1 specifies that SI messages sent by the BSC 12A to the UE 10 are not transparent on the Abis interface, but as set forth at §§8.5.1 and 8.6.2 are sent on the Abis as "BCCH INFORMATION and SACCH FILLING" messages. The "SACCH FILLING" is the relevant one for SI5 and SI6 messages sent on SACCH. So regardless of the specific implementation of the Abis by different BSS manufacturers, the BTS 12A can know that SI messages arriving on the Abis interface as "SACCH FILLING" messages are SI5 or SI6 messages for eventual transmission on the SACCH (specifically, the SI5 or SI6 message for transmission are derived from the SACCH Filling message). The BTS 12A can use this knowledge to deactivate ciphering of the corresponding SACCH blocks (assuming activated ciphering is the default condition, or to activate not ciphering if otherwise).

For SACCH messages sent from the UE 10 in the UL direction, the interfaces are similar and so the UE DP 10A and RF front end 10D can detect the content of a SACCH block before the ciphering process similar to that detailed above for the BSC 12A and BTS 12D.

For the second item noted above it was stated that the receiving entity should be able to detect whether a received SACCH block is ciphered or not based on that block alone. The receiving entity is unaware of the content of that block as that block is received. Two solutions to this issue are presented below: double decoding and explicit signaling.

Double decoding: On the transmit side, if GSM ciphering is done after interleaving and prior to modulation, so in order the functional blocks within the BTS 12D or RF front end 10D are interleaver→cipher→modulator. There may be other functional blocks interspersed such as power amplification or channel encoding but these are not relevant to the double decoding solution. Other radio technologies may or may not have the same serial arrangement of functional processing. In GSM the specific ciphering block is a stream cipher applied on the bits of a burst's payload every TDMA frame (e.g., a SACCH block consists of four normal bursts each carrying 114 payload bits, where each burst is sent in a given TDMA frame). The stream cipher applies a 114 bit mask every TDMA frame given by a frame number count parameter.

Figure 2:
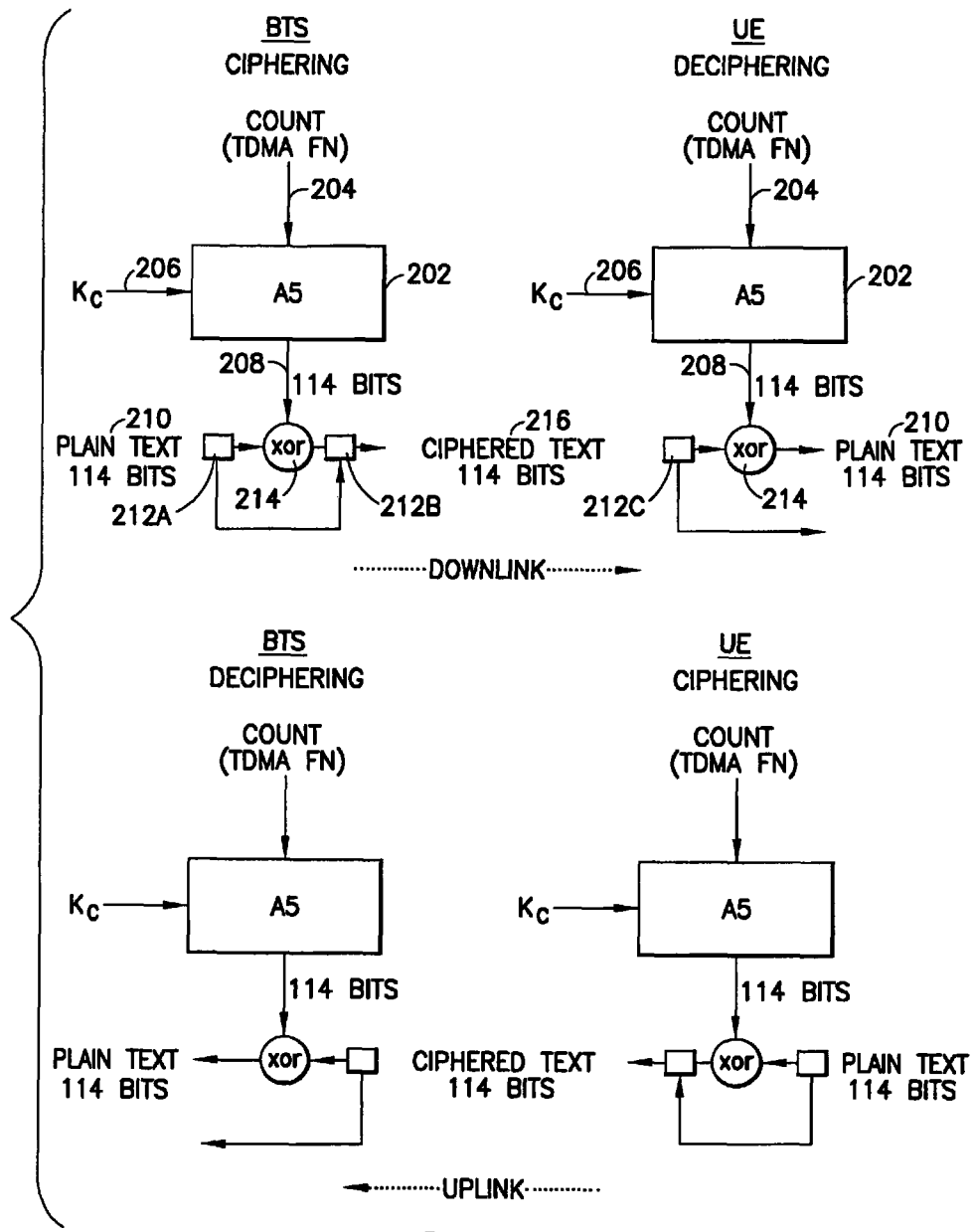
FIG. 2 is a schematic diagram showing ciphering and deciphering of a data message carried on the SACCH according to exemplary embodiments of the invention.

FIG. 2 illustrates the relevant GSM type ciphering blocks for ciphering and deciphering at both the BTS 12D and the UE 10 (RF front end 10D) as modified by these teachings to include a 'no cipher' option that is selectable based on message content. Specifically, for BTS ciphering there is input to a ciphering block 202 a count 204 which is the TDMA FN and a ciphering key 206 depicted as $K_c$. The ciphering block/stream cipher 202 executes the GSM A5 algorithm on these inputs and outputs a 114-bit mask 208. A plain text data block 210 also of length 114 bits arrives from the interleaver (not shown) and passes through a first switch 212A to a logic gate 214, specifically an XOR logic block, which exclusively OR's the two inputs bit by bit to achieve an output also of 114 bits which is the ciphered text 216 that is output to the modulator (not shown) and transmitted in the SACCH or FACCH block to the UE 10. For the case in which the data block is a SI message the first switch 212A bypasses the plain text block 210 around the XOR gate 214 and it is the plain text block 210 which is transmitted on the SACCH or FACCH. Output from the XOR gate during the bypass option is blocked by a second switch 212B, or alternatively the ciphering block 202 is not enabled during bypass. However implemented, the sole output from the BTS 12D as illustrated at the upper left of FIG. 2 is the 114 bit plain text block for the case in which ciphering is bypassed. The switches 212A, 212B may be implemented by software only, or a combination of software and hardware.

Figure 3A:
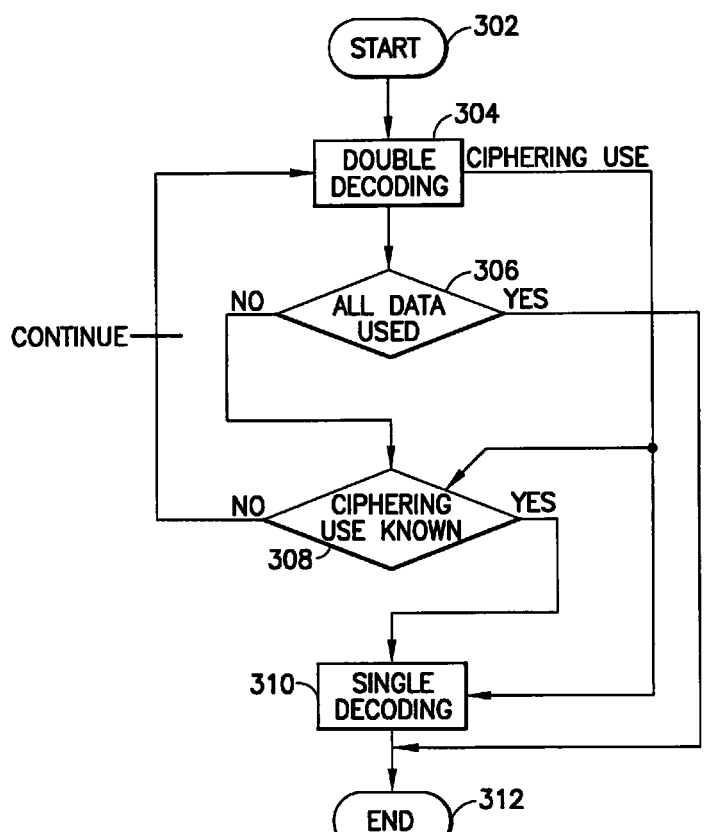
FIG. 3A is a flow diagram illustrating a double decoding process for deciphering data messages received on a control channel in accordance with exemplary embodiments of the invention.
Figure 3B:
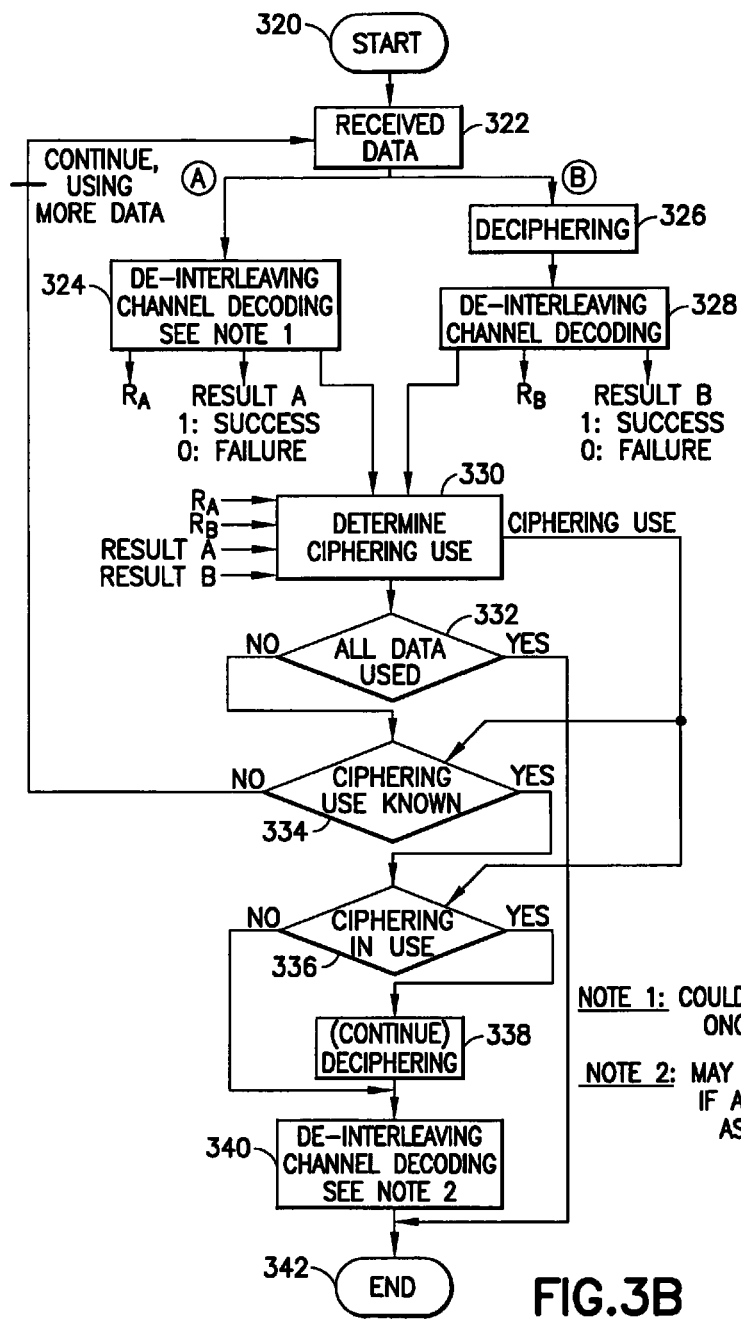
FIG. 3B is a flow diagram detailing an exemplary embodiment of the double decoding block of FIG. 3A.

The message received at the UE 10 may or may not be ciphered. FIGS. 3A-C detail the double decoding process but FIG. 2 illustrates one implementation of the related hardware. Like reference numbers at the UE 10 are previously described for the BTS 12D at FIG. 2. The received message 216 (or it may be plain text 210) is input from the demodulator (not shown) to a splitter 212C which inputs one copy of the 114 bit received burst to the XOR block 214 and one copy of the 114 bit received burst to a bypass around the XOR gate 214. As will be detailed for FIG. 3B-C, if the received burst was ciphered the output of the XOR gate 214 is a plain text block 210 of 114 bits and the output on the bypass route is an un-deciphered block of 114 ciphered bits. If instead the received block was not ciphered, the output of the XOR gate 214 is an unintelligible jumble of 114 bits and the output of the bypass route is the plain text block 210 of 114 bits. For the explicit signaling option, the splitter 212C of FIG. 2 may be instead be a switch which puts the received 114 bit burst to only one output. The lower portion of FIG. 2 illustrates similarly as the upper portion but largely in mirror image to illustrate processing for the case in which the UE is the transmitting entity which selectively ciphers or not the burst which it sends UL to the BSS 12 and BTS 12D. Note that FIG. 2 assumes GMSK modulation and the processing is for each burst of a radio block (where one burst is sent in a given TDMA frame).

As detailed with particularity above, when ciphering is used every burst of a SACCH block is ciphered, and when ciphering is not used (bypassed) no single burst of a SACCH block is ciphered. Therefore, exemplary embodiments for the receiving entity is to decipher each burst as they are received, or to decipher each burst once all four bursts of the frame have been received. These are only exemplary and not limiting.

FIGS. 3A-C illustrate exemplary process steps for the double decoding solution at the receiving entity. Not knowing whether a received SACCH block is ciphered or not means that the receiving entity must consider that the received block might be either ciphered or not ciphered until some reliable determination can be made. Once a reliable determination is reached, the block or individual bursts thereof can be treated according to the determination. This might be implemented in one exemplary embodiment as an iterative process where gradually more data is used in each subsequent iteration and where each iteration uses "double decoding"; the received data is treated both as if it were ciphered and as if it were not ciphered. FIG. 3A is a general representation of the double decoding principle, with further detail at FIGS. 3B-C. Data is received at block 302 and entered into the double decoding block 304. If a determination is made that the data block or burst is ciphered the process moves to block 310 where single decoding is used as shown at FIG. 2 for the data 216 passing through the XOR gate 214 at the receiving entity. If in this iteration it is indeterminate whether the data under consideration is ciphered, then at block 306 it is checked whether all data in the block has been used (e.g., was that the last possible iteration?). If yes then the process ends at block 312 with the likely cause that the data was corrupted and cannot be properly decoded (ciphered or not). If at block 306 less than all the data (either all data per burst or all data in the four-burst block) has been used in the current iteration then at block 308 it is checked whether it is yet determined if the data is ciphered. If yes then the whole data block or the individual burst is deciphered at block 310, and if no the double decoding process repeats at block 304 with an additional iteration using a bit more of the data block or burst (e.g., one additional bit, or some fixed plurality of additional bits per iteration, e.g. the 114 bits of a data burst). As is detailed further below with respect to FIG. 3B, the determination whether the received data is ciphered or not ciphered may be per burst, or per data block in different implementations. The determination may be made at any point in the iterative process, regardless of whether or not an entire burst has been decoded to make the determination of ciphered or not ciphered.

FIG. 3B illustrates one implementation of the double decoding block of FIG. 3A, and additionally showing subsequent blocks from FIG. 3A for completeness. At FIG. 3B we begin at start block 320 with the received data 322 which at this point the receiving entity is unaware whether it is ciphered or not. Using the splitter 212C option of FIG. 2 one instance of the received data is put to a bypass path A which avoids the XOR gate 214 and stream cipher 202, and another instance of the received data is put to a deciphering path B which passes through the XOR gate 214. In FIG. 3B, as detailed above for FIG. 3A, the whole data block (or individual burst as the case may be) is not put through on the first pass, but each subsequent iteration adds an additional portion (one or more bits) of that block or burst. In one embodiment the iterative processing is done per burst and the determination at block 330 whether or not ciphering is used is per burst, and in another embodiment each subsequent iteration is continued with an additional portion of the whole data block (in GSM there are four bursts per data block) and the determination at block 330 whether ciphering is used is for the whole data block.

On the bypass path A the portion of the received data block being processed on the current iteration is de-interleaved and channel decoded at block 324. Output from the bypass path A are at least two results: result A which is a binary indication of success or failure from the non-deciphering decoding processing at block 324, and a reliability of result A which is represented as $R_A$. In an exemplary embodiment, processing on bypass path A is not iterative but only once on the entire block, or alternatively once per each data burst.

On the deciphering path B the portion of the received data block or burst being processed on the current iteration is deciphered at block 326 (via the XOR gate 214 of FIG. 2 for example), and also de-interleaved and channel decoded at block 328. Output from the deciphering path B are also at least two results: result B which is a binary indication of success or failure from the combined deciphering and decoding at blocks 326 and 328, and a reliability of result B which is represented as $R_B$.

The four results from the two paths A and B are then Result A, $R_A$, Result B, and $R_B$. These are input to the determination block 330 which decides per deciphering path B iteration, so ciphering or not ciphering may be concluded whether the current iteration included 114 bits of an entire burst, less than an entire burst, or more than 114 bits which span more than one burst of the whole received data block. If there is a positive determination as to ciphering or not ciphering at block 330, then block 336 is entered. If ciphering is determined to be in use at block 336 then deciphering is continued at block 338 for the remainder of the data, if any, which was not deciphered at deciphering path B. Block 338 of FIG. 3B corresponds to the single decoding block 310 of FIG. 3A. In one implementation the determination at block 330 is per burst and the continued deciphering at block 338 is on only that burst; in another implementation the determination at block 330 applies for the whole four-burst data block, even if the determination is made while iteratively decoding only the first burst of that data block (or a portion thereof), and the continued deciphering at block 338 is for the entire four-burst data block. The whole data block (or one of its bursts) is de-interleaved and channel decoded at block 340 (unless already done on path B which would be the case only if the current iteration processed on path B was the entire data block). If instead ciphering is determined to not be in use at block 336 then the process skips to block 340 where the whole data block or burst (as the case may be for the different implementations) is de-interleaved and channel decoded (unless already done on path A).

If instead it is indeterminate at block 330 as to whether the data block is ciphered, then like block 306 of FIG. 3A it is checked at block 332 of FIG. 3B whether the current iteration (on path B at least) used all the data in the received block or burst, and if yes the data is corrupted and the process ends at block 342. If the current iterations did not use all the data (of either the individual 114 bit data burst or the entire four-burst block, according to the different implementations noted above) then block 332 checks whether it is known if ciphering is used on the data. Block 332 of FIG. 3B corresponds to block 308 of FIG. 3A. If yes for block 334, then block 336 is entered whose results are detailed above. If no for block 334, then the process begins again at block 322 for the next iteration with the next quantum of data from the whole received block (or from the individual burst according to the different implementations) added for further processing at least along path B.

FIG. 3C illustrates a decision table for various combinations of the four inputs to block 330. This is exemplary only and not limiting. As stated at FIG. 3A, value 1 for Result A or Result B means the respective decoding was successful and value 0 means it failed. It is indeterminate whether ciphering is in use in all cases except where there is a significant difference between the respective path reliabilities $R_A$ and $R_B$, conditional on confirmation by the success/failure binary Results bits. With each iteration the reliability is expected to increase, and so it is reasonable that with each subsequent iteration the reliability values close toward whatever threshold difference between the reliability values is set at block 330 for the 'significant difference' criteria.

FIG. 4 represents a normal burst using GMSK modulation in GSM and illustrate an exemplary implementation of the explicit signaling solution to enable the receiving entity to make the determination whether or not the received block or burst is ciphered. There is explicitly signaled in each SACCH block an indication whether or not ciphering is used. In GSM each burst of a SACCH block is a normal burst containing 116 bits of information. These are shown at FIG. 4 as a first payload portion 402A of 57 bits and a second payload portion 412B of 57 bits. Tail, guard and training bits are unaffected by this exemplary embodiment. The additional two bits of the 116 bit SACCH burst are stealing bits, of which one or more of them are re-defined according to this second solution to be a ciphering indicator 404. These are bits e57 and e58 used normally for indication of control channel signaling. Conventionally they are each set to value "1" for SACCH and are not ciphered. In this embodiment they also are not ciphered, regardless of whether or not the payload bits 202A, 202B are ciphered.

The inventors have determined that these stealing bits are redundant for SACCH data blocks. Conventionally these stealing bits are set to "1" in every burst of a SACCH block. Also, the coding of a SACCH block is fixed, and each SACCH burst always and only occurs at a fixed position(s) in a 26-multiframe. Specifically, a 26-multiframe contains 26 TDMA frames, and on a full rate channel the SACCH burst is always and only mapped on frame number 12 which is the thirteenth sequential TDMA frame while on a half-rate channel the SACCH burst occurs either on FN 12 (subchannel 0) or FN 25 (subchannel 1). Therefore the stealing bits on the SACCH data blocks give no additional information. Since in this embodiment the re-defined stealing bits are not ciphered, the receiving entity can check them to see if the burst (and by extension every burst of a SACCH block) in which they lie is ciphered or not ciphered.

By example, those redefined stealing bits with their value set to '0' in each burst is an indication that ciphering is used on the burst (hence that the SACCH block to which the burst belongs is ciphered). This maximizes the Hamming distance from the conventional value of '1', which as redefined herein indicates that ciphering is not used on the burst (hence that the SACCH block to which the burst belongs is not ciphered). This implementation allows ultimately using the eight stealing bits to detect the ciphering indication with high reliability.

Specific to GSM, the EPCCH makes use of the bits e57 and e58 in each burst of a SACCH block in the case of enhanced power control, and so this second solution would not be exactly applicable where enhanced power control is in use.

Above it was noted that the transmitting entity should know in advance that the receiver supports Dynamic content-based ciphering on SACCH in order to use it, and when used the transmitting entity should inform the receiver accordingly. In an exemplary embodiment this is done by a capability indicator set in the UE's classmark rating which it signals to the network (or which the networks gets from another network node in a handover of the UE). An exemplary capability bit is in one implementation set to value "0" to indicate the UE does not support dynamic content based ciphering on the control channel, and its value is set to "1" to indicate that the UE does support that ciphering. In an exemplary embodiment this bit is in the UE Classmark 3 information element. In an exemplary embodiment where Dynamic content-based ciphering on SACCH is used only in DL, this support bit indicates whether the UE is able to dynamically detect if a data block is ciphered or not, and to decode both ciphered and un-ciphered data blocks. In another exemplary embodiment where Dynamic content-based ciphering on SACCH is used in both DL and UL, this support bit indicates, in addition to the above, that the UE is able to perform dynamic content-based ciphering on SACCH (i.e. as a transmitter).

Now that the network has checked the UE's capability using the Classmark 3 IE and sees that the mobile station supports Dynamic content-based of ciphering on SACCH, the network then sends an indication to the UE that the mode is active in which the dynamic content based ciphering is used. That is, if used in the DL, even if the UE's capability bit indicates it is compatible with dynamic content based ciphering, in one mode the network uses the content based ciphering and the UE knows from that mode that it must double decode or check the stealing bits as above when ciphering is started between the network and the UE, and in the other mode dynamic content based ciphering is not used i.e. the UE has no need for double decoding or checking the ciphering indicator bit since all data messages on that channel are either ciphered in this other mode when ciphering is started between the network and the UE, or not ciphered at all when ciphering is not started between the network and the UE. If used in the UL, even if the UE's capability bit indicates it is compatible with dynamic content based ciphering, in one mode the network uses the content based ciphering and the UE knows from that mode that it must dynamically cipher SACCH blocks based on their content, and possibly set the stealing bits as above accordingly, when ciphering is started between the network and the UE, and in the other mode dynamic content based ciphering is not used i.e. the UE must either cipher all data messages on that channel when ciphering is started between the network and the UE, or cipher none when ciphering is not started between the network and the UE. For brevity, term this mode indication an "SCS" indication, which sets selective use of ciphering on SACCH.

In one exemplary embodiment the SCS indication is sent by the access node 12 to the UE 10 in the CIPHERING MODE COMMAND message, which is the message used to initiate the ciphering mode setting. The SCS indication may in one exemplary embodiment be added to the conventional CIPHERING MODE COMMAND message. In order not to increase the size of the CIPHERING MODE COMMAND message, in another embodiment the SCS indication could also be introduced as part of the Cipher Response IE which contains 3 spare bits, as shown particularly at FIGS. 5A-F. Additionally, the SCS indication may also be added in other exemplary embodiments to the HANDOVER COMMAND message as shown at FIG. 7B, the ASSIGNMENT COMMAND message as shown at FIG. 8, and the DTM ASSIGNMENT COMMAND message as shown at FIG. 9. For embodiments in which the SCS indication is a wholly new IE, such a new IE may also be introduced in the CIPHERING MODE COMMAND message as shown at FIG. 6.

Figures 5A, 5B:
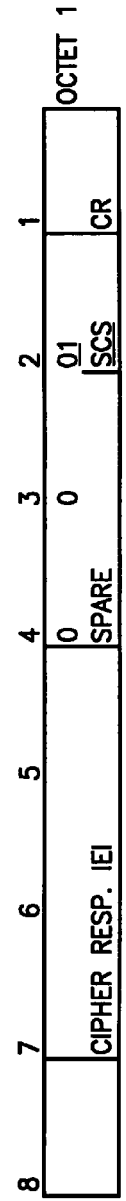

One implementation of the SCS indication is within the Cipher Response IE, set forth at 3GPP TS 44.018 v9.6.0 (2010-09) section 9.1.9. FIG. 5A amends table 9.1.9.1 of that section to add a new row 602 for the cipher response indicator. By example, section 10.5.2.10 of 3GPP TS 44.018 v9.6.0 (2010-09) may be amended with underlining as follows:

10.5.2.10 Cipher Response

The Cipher Response information element is used by the network to indicate to the mobile station which information the mobile station has to include in the CIPHERING MODE COMPLETE message, and whether selective use of ciphering on SACCH is used.

The Cipher Response information element is coded as shown in Figure 10.5.2.10.1 and table 10.5.2.10.1.

The Cipher Response is a type 1 information element.

Figures 5C, 5D, 5E:
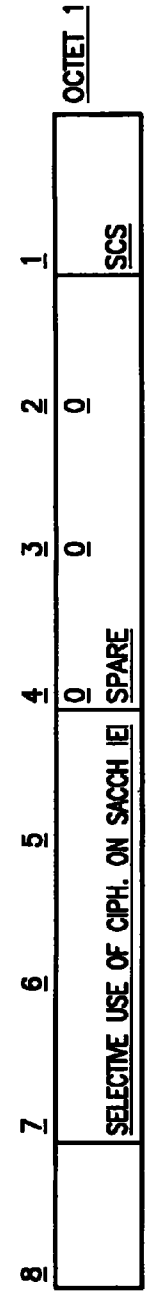

FIG. 5B illustrates one octet of the cipher response IE indicator in which one or more of the spare bits are used for this SCS indicator. FIG. 5B uses the bit in position 2 for the SCS indication and amends Figure 10.5.2.10.1: Cipher Response information element of 3GPP TS 44.018 v9.6.0 (2010-09). Underlining at FIG. 5C shows changes to table 10.5.2.10.1 of 3GPP TS 44.018 v9.6.0 (2010-09) for the above SCS indicator. A new Selective use of Ciphering on SACCH IE may by example be defined in 3GPP TS 44.018 as shown below:

10.5.2.9a Selective Use of Ciphering on SACCH

The Selective use of Ciphering on SACCH information element is used by the network to indicate to the mobile station whether selective use of ciphering is used on SACCH in the downlink, when ciphering is used between the network and the mobile station.

The Selective use of Ciphering on SACCH information element is coded as shown in Figure 10.5.2.9a.1 and table 10.5.2.9a.1.

The Selective use of Ciphering on SACCH is a type 1 information element.

Such a new IE may also be shown in 3GPP TS 44.018 as illustrated at FIG. 5D, by example named in that specification as Figure 10.5.2.9a.1 "Selective Use of Ciphering on SACCH information element" following the above paragraph, and explained as illustrated at FIG. 5E which by example may be named table 10.5.2.9a.1 "Selective Use of Ciphering on SACCH information element".

By example table K.2 of 3GPP TS 44.018 v9.6.0 (2010-09) may be amended according to these exemplary embodiments as shown by the underlined portions of FIG. 5F to define this new IE indicator.

FIG. 6 illustrates table 9.1.9.1 CIPHERING MODE COMMAND message of 3GPP TS 44.018 v9.6.0 (2010-09) as modified according to an exemplary embodiment to include the Selective use of Ciphering on SACCH IE indictor, where underlining indicates the modifications. In an embodiment this is also defined that this new IE could be included only if the Start Ciphering (SC) bit in the Cipher Mode Setting IE is set to "1" (i.e. start ciphering), and should be ignored otherwise (if it were included). Currently the SC bit is in bit position index number 1 within octet 1 of the Cipher Mode Setting IE defined at section 10.5.2.9 and illustrated at Figure 10.5.2.9.1 of 3GPP TS 44.018 v9.6.0 (2010-09).

FIGS. 7A-B illustrates table 9.1.15.1 HANDOVER COMMAND message of 3GPP TS 44.018 v9.6.0 (2010-09) as modified according to an exemplary embodiment to include the Selective use of Ciphering on SACCH IE indictor, where shading at FIG. 7B indicates the modifications. It is currently defined for the Cipher Mode Setting IE that:

If this information element is omitted, the mode of ciphering is not changed after the mobile station has switched to the assigned channel.

In the case of inter-RAT or inter-mode handover to GERAN A/Gb mode, the HANDOVER COMMAND message shall always contain the cipher mode setting IE (see sub-clause 3.4.4.1).

In this exemplary embodiment it is clarified that if the Selective use of Ciphering on SACCH IE is omitted, the mechanism is not used after the mobile station has switched on the assigned channel. This is because the mobile station may no longer be under control of the same BSS after handover and the new BSS may not support this mechanism.

FIG. 8 illustrates table 9.1.2.1 ASSIGNMENT COMMAND message of 3GPP TS 44.018 v9.6.0 (2010-09) as modified according to an exemplary embodiment to include the Selective use of Ciphering on SACCH IE indictor, where both shading and underlining indicates the modifications. It is currently defined for the Cipher Mode Setting IE that:

If this information element is omitted, the mode of ciphering is not changed after the mobile station has switched to the assigned channel.

The relevant wireless standards may also be clarified that if the Selective use of Ciphering on SACCH IE is omitted, the use of this mechanism is not changed after the mobile station has switched to the assigned channel. This works because the mobile station remains under control of the same BSS.

FIG. 9 illustrates table 9.1.12e.1 DTM ASSIGNMENT COMMAND message of 3GPP TS 44.018 v9.6.0 (2010-09) as modified according to an exemplary embodiment to include the Ciphering mode setting and the Selective use of Ciphering on SACCH IE indictor, where both shading and underlining indicates the modifications.

It is currently defined for the Cipher Mode Setting IE that:

If this information element is omitted, the mode of ciphering is not changed after the mobile station has switched to the assigned channels. This information element shall not be included if support for this IE has not been indicated by the mobile station in the Mobile Station Classmark 3 IE (see 3GPP TS 24.008).

The relevant wireless standards may also be clarified that if the Selective use of Ciphering on SACCH IE is omitted, the use of this mechanism is not changed after the mobile station has switched to the assigned channel. This is because the mobile station remains under control of the same BSS. An exception to this rule could be made for the case of handover (with the HANDOVER COMMAND message) when a change of BSC is done.

All of the above examples which were specific as to control channel on which the data message was sent used the SACCH. But an SMS could also be sent on the FACCH in GSM according to these teachings, such as if ciphering on the SACCH were no longer possible. The FACCH steals blocks from the TCH for a signaling exchange between the mobile station/UE and the network (such as handover messages). The Data Link layer protocol (3GPP TS 44.006) detailed above for the SACCH operates on both SACCH and FACCH and so may be used to beneficial effect for data messages on the FACCH.

For transmission of SMS on the FACCH the acknowledged mode (multiple frame operation) is required, which as per DL protocol uses a window size equal to one. While such a window size ensures the impact to speech quality (e.g., frame error rate) of sending an SMS on SACCH is minimal, especially considering concatenated SMSs (where additional scheduling rules could also be considered), it could in some instances introduce unacceptable delays should a higher priority signaling have to be sent, such as a Handover Command message. In order to ensure that the transmission of an SMS on the FACCH would not delay the sending of a higher priority signaling, a preemption mechanism could assure the SMS on the FACCH does not adversely affect the higher priority message. By example, the transmitting entity can check its transmit buffer to see if there are any higher priority messages queued for that UE and if there are it can delay transmission of the ciphered SMS data message until after the HANDOVER COMMAND or other higher priority message is transmitted.

Figure 10A:
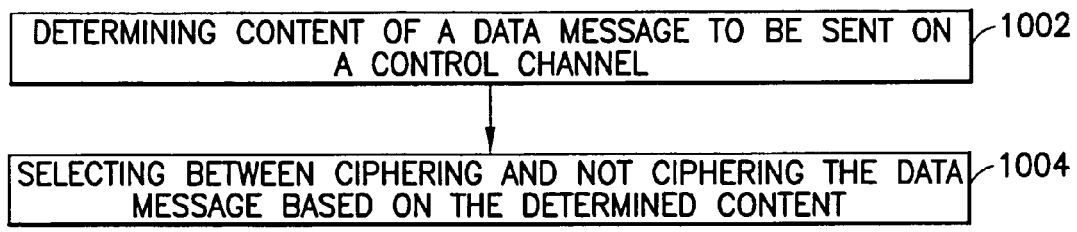
FIGS. 10A-C are logic flow diagrams that illustrate the operation of methods, and results of execution of computer program instructions embodied on computer readable memories, in accordance with the exemplary embodiments of this invention.
Figure 10B:
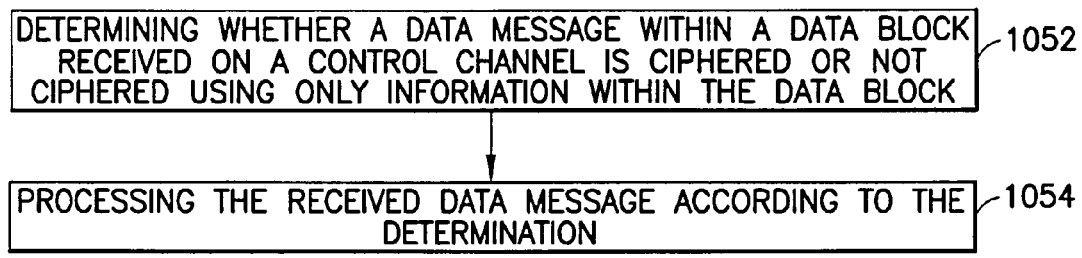
Figure 10C:
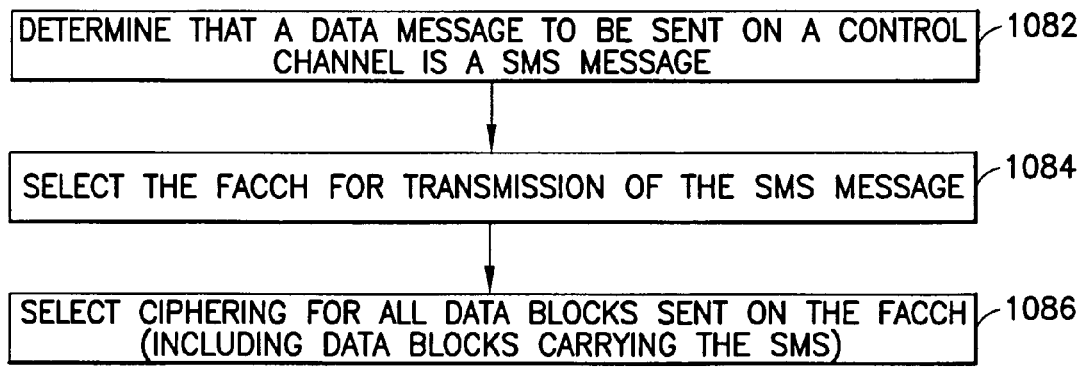

FIGS. 10A-C are logic flow diagrams that illustrate, in accordance with various exemplary embodiments of the invention, the operation of methods, and a result of execution of computer program instructions embodied on computer readable memories, and various apparatus controlled by a processor running computer instructions stored on a memory. FIG. 10A illustrates an exemplary SACCH embodiment from the perspective of the transmitting entity, FIG. 10B illustrates an exemplary SACCH embodiment from the perspective of the receiving entity, and FIG. 100 illustrates an exemplary FACCH embodiment.

At block 1002 of FIG. 10A at the transmit side of the air interface 15, content is determined of a data message to be sent on a control channel. At block 1004 there is a selection made between ciphering and not ciphering the data message based on the determined content. The above exemplary embodiments give further detail as to these elements of FIG. 10A.

At block 1052 of FIG. 10B at the receive side of the air interface 15, it is determined whether a data message, within a data block received on a control channel, is ciphered or not ciphered. That determination is made using only informotion within the data block itself. At block 1054 the received data message is processed according to that determination. The above exemplary embodiments give further detail as to these elements of FIG. 10B.

In an embodiment for this FACCH option the network may check the UE mode and capabilities as above, but for the FACCH. The transmitting entity at block 1082 determines that a data message to be sent on a control channel is a SMS message. In response to that determination, the transmitting entity at block 1084 selects the FACCH for transmission of the SMS message (since it is assumed that SACCH is not available for ciphered messages) and also at block 1086 selects ciphering for all data blocks sent on the FACCH, which of course includes the data blocks carrying the SMS it transmits. In a specific embodiment, for the case in which the SMS is sent DL (e.g., the transmitting entity is a network access node), a transmit queue/buffer for the UE to which the SMS is addressed is checked and transmission of the ciphered SMS to the UE on the FACCH is delayed if a HANDOVER COMMAND message is queued for transmission to the UE, since the HANDOVER COMMAND message to that same UE would be sent on that same FACCH.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The various blocks shown in FIGS. 10A-C may be viewed as different method steps, and/or as operations that result from operation of computer program code, and/or as a plurality of coupled logic circuit elements constructed to carry out the associated function(s). At least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

What is claimed is:

1. A method comprising:
   determining content of a data message to be sent on a control channel;
   selecting between ciphering and not ciphering the data message based on the determined content;
   performing one of ciphering and not ciphering the data message based on the selection; and
   transmitting the data message,
   wherein said method is performed by an apparatus, said apparatus being one of a mobile communication device (UE) and a base station subsystem (BSS), and
   wherein:
   when the determined content is that the data message is a short message service message, the selecting is for ciphering the data message; and
   when the determined content is that the data message is a system information message, the selecting is for not ciphering the data message.

2. The method according to claim 1, wherein at least for the case in which the determined content is that the data message is the short message service message, the content is determined by checking a service access point identifier for a data block comprising the data message.

3. The method according to claim 2, in which:
the content is determined to be the short message service message for the case in which the checked service access point identifier for the data block is SAPI 3; and
the content is determined to be the system information message for the case in which the checked service access point identifier for the data block is SAPI 0.

4. The method according to claim 1, wherein at least for the case in which the selecting is for ciphering the data message, the method further comprises:
setting an explicit indication in at least one burst which comprises at least part of the data message, in which the explicit indication is not ciphered.

5. An apparatus comprising:
at least one processor; and
at least one memory storing computer program code; in which at least one memory and the computer program code are configured, with the at least one processor, to cause the apparatus at least to:
determine content of a data message to be sent on a control channel;
select between ciphering and not ciphering the data message based on the determined content;
perform one of ciphering and not ciphering the data message based on the selection; and
transmit the data message,
wherein:
ciphering the data message is selected for the case in which the determined content is that the data message is a short message service message; and
not ciphering the data message is selected for the case in which the determined content is that the data message is a system information message.

6. The apparatus according to claim 5, wherein at least for the case in which the selection is for ciphering the data message, the at least one memory and the computer program code are configured with the at least one processor to cause the apparatus at least further to:
set an explicit indication in at least one burst which comprises at least part of the data message, in which the explicit indication is not ciphered.

7. The apparatus according to claim 6, in which the explicit indication is set in dependence on the determined content, and the selection between ciphering and not ciphering the data message is based on the explicit indication which is set.

8. The apparatus according to claim 6, in which the explicit indication uses at least one stealing bit.

9. The apparatus according to claim 5, in which the apparatus comprises a network access node and the data message is addressed to a user equipment;
wherein the content determination and the selection between ciphering and not ciphering the data message is conditional on the network access node activating with the user equipment a mode of dynamic content based ciphering on the control channel.

10. A method comprising:
determining whether a data message within a data block received on a control channel is ciphered or not ciphered using only information within the data block; and
processing the received data message according to the determination,
wherein:
the data message is ciphered when it is a short message service message; and
the data message is not ciphered when it is a system information message.

11. The method according to claim 10, wherein determining whether a data message within a data block received on a control channel is ciphered or not ciphered comprises:
attempting to decode the received data message in a first instance as if the data message were not ciphered;
attempting to decode the received data message in a second instance as if the data message were ciphered; and
comparing results of the first and second instances to determine whether the data message is ciphered or not ciphered.

12. The method according to claim 11, wherein attempting to decode the received data message in a second instance as if the data message were ciphered is an iterative process, wherein more of the received data message is used in each subsequent iteration than was used in the previous iteration.

13. The method according to claim 12, wherein comparing results of the first and second instances to determine whether the data message is ciphered or not ciphered relies upon a first indicator and a second indicator, said first indicator being an indicator of success or failure of the decoding and said second indicator being an indicator of reliability of the decoding.

14. The method according to claim 10, wherein the determining comprises checking an explicit indication in at least one burst of the data block, in which the explicit indication is not ciphered regardless of whether or not the data message is ciphered.

15. The method according to claim 10,
wherein the determining is conditional on activating with a network access node a mode of dynamic content based ciphering on the control channel.

16. The method according to claim 15, in which activating the mode with the network access node is subsequent to sending to the network access node at least one capability bit.

17. The method according to claim 16, in which the mode is activated by an indication from the network access node that selective use of ciphering on the control channel is active.

18. The method according to claim 17, in which the selective use of ciphering indication is received in a CIPHERING MODE COMMAND message which comprises ciphering mode settings.

* * * * *